United States Patent [19]

Rajendren

[11] 4,409,100

[45] Oct. 11, 1983

[54] LIQUID AERATING DEVICE

[75] Inventor: Richard B. Rajendren, Belle Plaine, Minn.

[73] Assignee: Aeration Industries, Inc., Chaska, Minn.

[21] Appl. No.: 303,019

[22] Filed: Sep. 17, 1981

[51] Int. Cl.³ ............................. C02F 1/74; B01F 3/04
[52] U.S. Cl. ................................... 210/219; 210/220; 261/93; 261/DIG. 75
[58] Field of Search ...................... 210/194, 195.1, 219, 210/220, 221.1; 261/36 R, 87, 91, 92, 93, DIG. 75

[56] References Cited

U.S. PATENT DOCUMENTS

| | | | |
|---|---|---|---|
| 1,765,338 | 6/1930 | Jones et al. | 210/219 X |
| 2,061,564 | 11/1936 | Drake et al. | 261/93 |
| 2,063,301 | 12/1936 | Durdin, Jr. | 261/83 |
| 2,194,037 | 3/1940 | Thuma | 261/91 |
| 2,433,592 | 12/1947 | Booth | 261/93 |
| 2,515,538 | 7/1950 | Wall | 210/169 |
| 2,590,581 | 3/1952 | Shirley | 261/93 |
| 2,641,455 | 6/1953 | Poirot | 261/29 |
| 3,365,178 | 1/1968 | Bood | 261/DIG. 75 |
| 3,829,070 | 8/1974 | Reba et al. | 261/36 R X |
| 4,045,522 | 8/1977 | Nafziger | 261/93 |
| 4,240,990 | 12/1980 | Inhofer et al. | 261/87 |
| 4,290,979 | 9/1981 | Sugiura | 261/36 R X |
| 4,308,138 | 12/1981 | Woltman | 261/DIG. 75 |

FOREIGN PATENT DOCUMENTS 466143 5/1937 United Kingdom .

Primary Examiner—Robert H. Spitzer
Attorney, Agent, or Firm—Schuyler, Banner, Birch, McKie & Beckett

[57] ABSTRACT

An aerator (2) comprises a motor (10) having a propeller (18). A slotted cage (30) surrounds propeller (18) and prevents marine life from being drawn in to propeller (18). Liquid will be ejected from propeller (18) in a horizontally traveling stream which stream is oxygenated by a draft tube (48) having a lower end located adjacent propeller (18). Slotted cage (30) is carried on a support rod (68) to form the structure for supporting aerator (2) in tank (4). Cage (30) prevents marine life from being drawn into the propeller (18) as it is driven.

3 Claims, 3 Drawing Figures

LIQUID AERATING DEVICE

TECHNICAL FIELD

This invention relates to devices for aerating liquids such as water. More particularly, the aearating device of this invention is designed for use in commercial tanks, sea bodies, or aquariums for increasing the oxygen supply to fish and other marine life alive.

BACKGROUND OF THE INVENTION

Fish, shellfish and other marine life are kept in bounded natural bodies of water, tanks or aquariums for commercial breeding purposes. The water in such areas is often stagnant having little circulation. In such an environment the oxygen content of the water at various points often becomes too low. This kills marine life there. Thus, the use of mechanical water aerating devices has long been known for keeping the water in such areas properly oxygenated.

Mechanical aerators usually comprise an elongated shaft having a propeller at the end. A motor is provided for turning the shaft. The propeller is arranged to draw water vertically upwardly through a tube or enclosing structure to a point close to or at the surface of the water where the water becomes oxygenated. This oxygenated water then gradually falls back to the bottom of the tank where it is then drawn upwardly again to repeat the cycle. U.S. Pat. Nos. 2,194,037 and 2,515,538 are typical of such aerators.

The aerators described above oxygenate the tank by vertically lifting columns of liquid. The oxygenated water must then fall all the way back to the bottom of the tank for proper oxygentation to occur. This may or may not always occur or the water may have lost much of its oxygen content by the time it reaches the bottom of the tank. Thus, such aerators may not properly oxygenate the lower levels of the tank, especially when they are used in realtively deep tanks. In addition, the horizontal displacement of oxygenated water from such aerators is relatively small. Since such aerators are customarily mounted on the edge of the tank, it is difficult for them to oxygenate the interior portions of the tank. Even when such aerators can traverse the entire area of the tank, they must be moved many times to cover this area.

Another disadvantage with known prior art aerators is that they are relatively complex. For example, the water intake tube to the propeller must be sized sufficiently small so that fish and marine life will not be drawn into the propeller. If that is the case, then the oxygenating capacity of the aerator is relatively small simply because it can displace only small volumes of water. If the intake opening is enlarged, then separate screens are needed to cover the intakes for safety purposes. These screens add to the expense of the aerator. Moreover, a separate structure must be provided to mount the aerating equipment on the tank in which it is being used. This further increases the expense of the aerator.

SUMMARY OF THE INVENTION

It is an aspect of this invention to provide a liquid aerating device obviating some of the above noted disadvantages of the prior art. More particularly, one aspect of this invention relates to an aerator that aerates in a generally horizontal direction rather than a vertical direction in the body of water. Moreover, it is another object of this invention to provide an aerator that is extremely simple in construction and therefore relatively inexpensive to manufacture and purchase.

A device for aerating liquids according to this invention comprises a motor having a drive shaft. A propeller is secured to the drive shaft. The propeller has one or more propeller blades configured so that liquid is drawn into the propeller from a first side thereof and is ejected outwardly from the propeller on a second side thereof in a stream. Means is provided for mounting the motor and propeller in a liquid containing body such that the liquid stream ejected from the propeller travels in a generally horizontal direction. Finally, a hollow draft tube is provided having an upper end above the liquid surface. The draft tube has a lower end below the liquid surface which is adjacent to the propeller for supplying air to the liquid stream ejected from the propeller.

Another aspect of this invention relates to a device for aerating liquids which comprises a motor having a drive shaft. A propeller is secured to the drive shaft. This propeller has a number of propeller blades configured so that liquid is drawn into the propeller from a first side thereof and is ejected outwardly from the propeller on a second side thereof in a stream. A cage surrounds and encloses the propeller. This cage has a plurality of openings sized to admit liquid inside the cage to the propeller, but these openings are sufficiently small to keep out marine life. The cage also functions as the means for supporting the motor and propeller inside a liquid containing tank.

BRIEF DESCRIPTION OF THE DRAWINGS

This invention will be described in more detail hereafter, when taken in conjunction with the following drawings, in which like reference numerals refer to like elements throughout.

DETAILED DESCRIPTION OF THE PREFERRED EMBODIMENT

Figure 1:
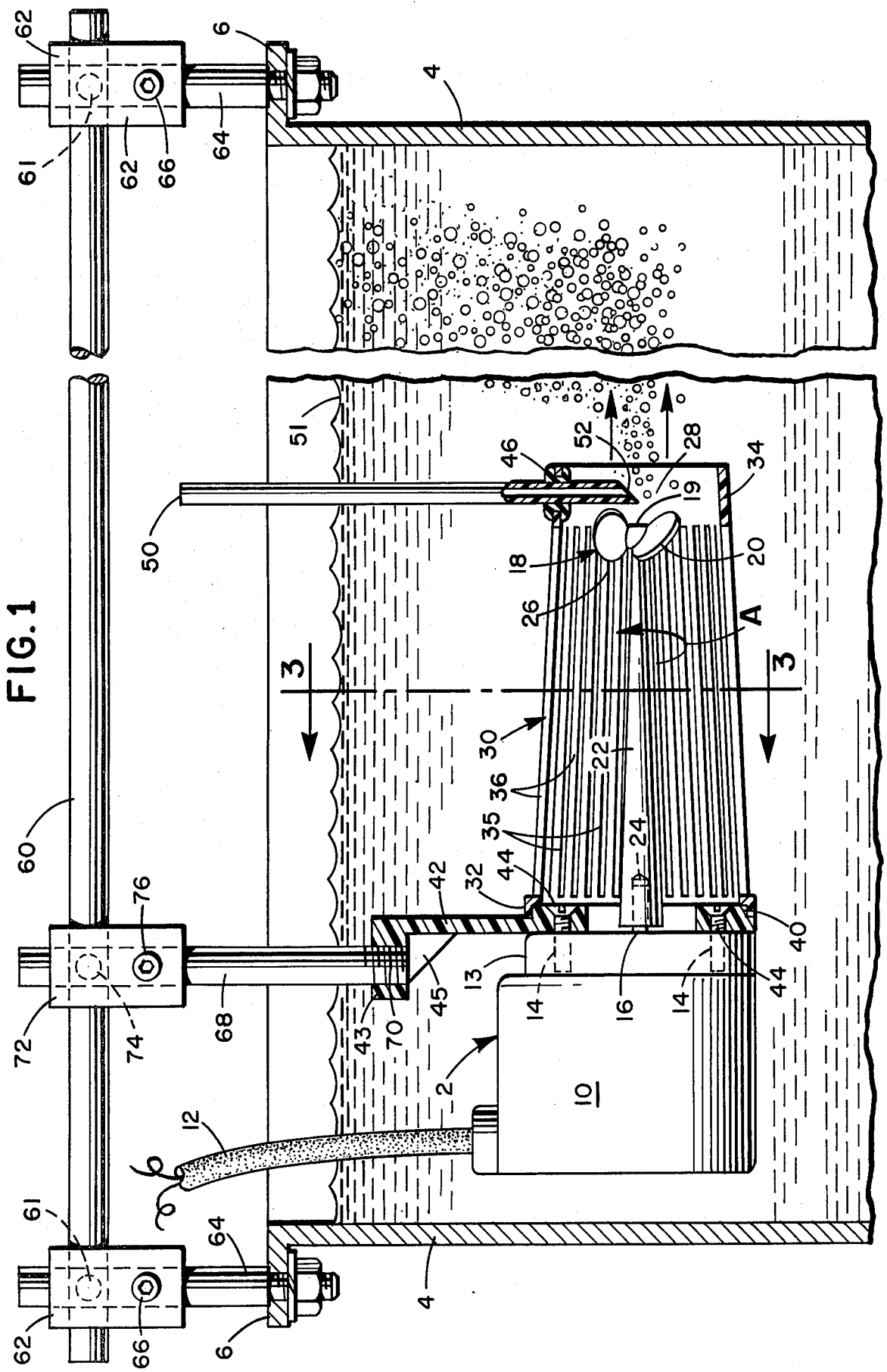
FIG. 1 is a cross sectional view of a liquid aerating device according to this invention, particularly illustrating the device installed inside a liquid containing tank or aquarium and ejecting a horizontally traveling stream of oxygenated air.
Figure 2:
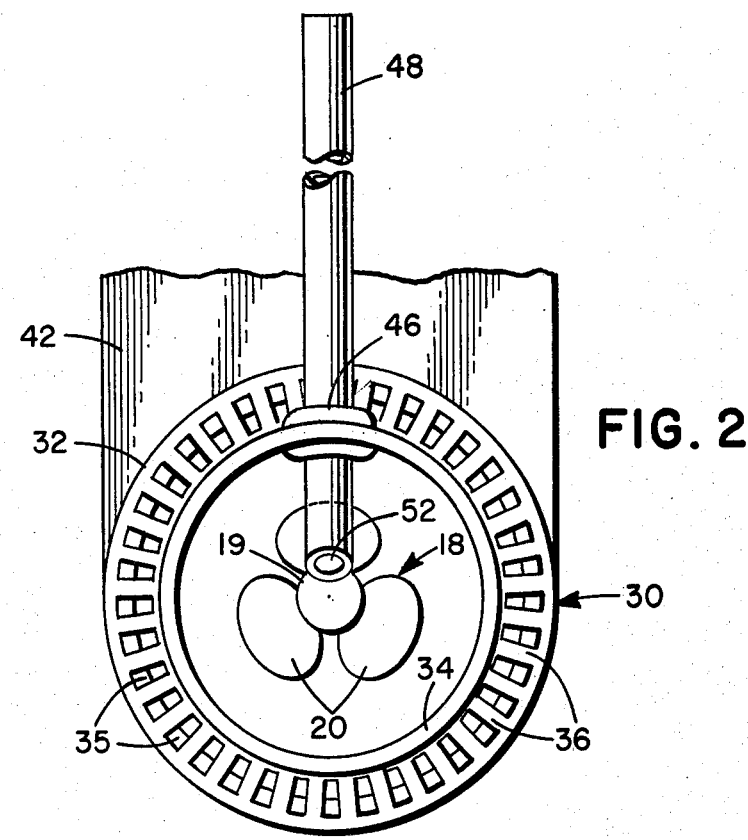
FIG. 2 is an end elevational view of the liquid aerating device of FIG. 1, particularly illustrating the propeller and draft tube thereof.
Figure 3:
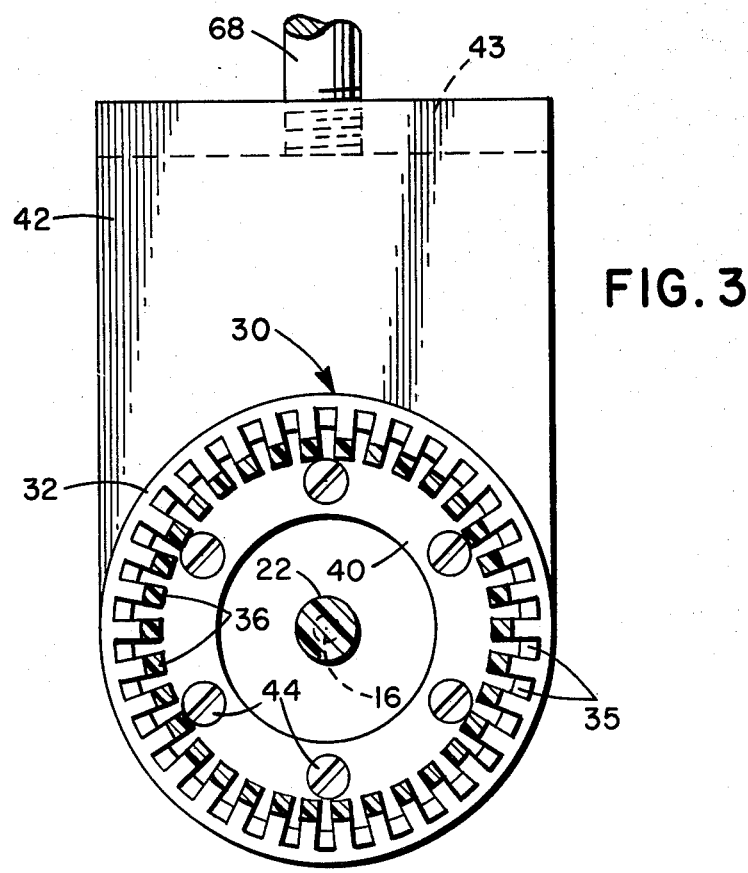
FIG. 3 is a cross sectional view of the liquid aerating device shown in FIG. 1, taken along lines 3—3 in FIG. 1.

An improved liquid aerating device or aerator according to the present invention is generally illustrated as 2. Aerator 2 is shown mounted to a vertical wall 4. The vertical wall 4 may be a boundary wall of an aquarium or tank, or a partition in a large commercial marine life hatchery. The aquarium or hatchery would contain marine life such as fish, shellfish such as shrimp, lobsters, etc. Aerator 2 is used to oxygenate the water to keep such marine life alive. However, aerator 2 is not meant solely for use in this environment, but could be used in other environments where aerators are typically employed. Preferably, the upper end of wall 4 is provided with outwardly extending horizontal flanges 6 which may be in the form of a lip. Flanges 6 serve as a portion of the means for attaching aerator 2 to wall 4.

Aerator 2 includes an electric motor 10. Motor 10 is of any suitable design which can be used underwater, e.g., a motor having a water seal housing. Motor 10 includes an electrical supply cord 12 having a water impervious casing which cord 12 extends up out of the water. Cord 12 will be connected to any suitable source of electric power. In addition, motor 10 has on one side thereof a circular mounting ring 13 having a plurality of circumferentially spaced threaded apertures 14. Motor 10 also has a threaded drive shaft 16 which extends outwardly through the open interior of ring 13. While an electric motor 10 has been disclosed herein as the motor source for aerator 2, any other suitable type of underwater motor could be employed.

Aerator 2 also includes a propeller 18. Propeller 18 comprises a central circular hub 19 and a plurality of outwardly extending propeller blades 20 angled relatively to the hub. A tapered elongated propeller shaft 22 extends outwardly from one side of hub 19. Propeller shaft 22 has a threaded bore 24 in its free end which threadedly receives the drive shaft 16 of motor 10. Thus, when propeller shaft 22 is threaded onto drive shaft 16 and motor 10 is activated, the propeller 18 on propeller shaft 22 will rotate in the direction of the arrow A in FIG. 1. Propeller blades 20 are angled such that water will be drawn into the propeller from a first side 26. The propeller blades then discharge this water in a stream on the second side 28 of the propeller. Because the propeller is stationary with respect to wall 4 during use, water is thus continuously drawn in through the first side 26 and ejected from the second side 28. Propeller 18 and propeller shaft 22 are preferably made of a plastic material or the like.

Aerator 2 also comprises a means for preventing the marine life contained in the water from being drawn into propeller 18. This safety means is a slotted cage 30 in the form of trunicated cone having a first end 32 and a second end 34. The ends 32 and 34 are in the form of circular ring-like structures. Cage 30 includes a plurality of slots 35 defined by the spaces between longitudinally extending ribs 36. Ribs 36 extend between and are secured to the first and second ends 32 and 34 of the cage. Cage 30 is sized to circumferentially surround and completely enclose propeller 18 and propeller shaft 22 as shown in FIG. 1. Thus, water can be drawn into propeller 18 through slots 35 in cage 30 which slots are sized to keep out the marine life in the water. Preferably, cage 30 is molded in a unitary piece by any conventional plastic molding process.

A mounting plate 42 connects the aerator 2 to a support structure. The plate 42 includes a circular flange 40, which fits within and is attached to the first end 32 of the cage 30. Flange 40 includes a plurality of circumferentially spaced holes through which bolts or screws 44 pass. The screws 44 are received in the threaded apertures 14 in mounting ring 13 of motor 10. Thus, motor 10 is fixedly secured to the first end 32 of cage 30 simply by screwing the screws 44 into the apertures 14. The circular flange 40 may be unitary with the rest of the plate 42 or alternatively made integral with the cage 30. The upper end of plate 42 terminates in a horizontal support flange 43 which is reinforced by a triangular rib 45. Plate 42 and flange 43 serve, in conjunction with other components described hereafter, as a means for supporting aerator 2 within the water.

The second end 34 of cage 30 is open to define a water discharge port through which the stream of water ejected from propeller 18 passes. A portion of the end 34 includes a boss or mounting bracket 46 through which a hollow draft tube 48 passes. The bracket 46 is preferably a rubber grommet. Draft tube 48 maybe held in a bore in bracket 46 by friction so that it can be easily coupled and uncoupled thereto, and its position relative to the propeller 18 easily adjusted. Draft tube 48 has an upper end 50 located above the surface 51 of the liquid in tank 4. The lower end 52 of the draft tube 48 is cut upwardly at an angle relative to the propeller 18. Lower end 52 is located beneath the level of the liquid surface 51 substantially closely adjacent to propeller 18 on the second side 28 thereof in the stream of the liquid ejected by propeller 18 with the cut lower end extending upwardly in the direction away from the propeller 18. This liquid stream will pass past the face of the draft tube 48 and induce a suction therein due to the Venturi effect. This suction helps draw air down through draft tube 48 to oxygenate the liquid stream being ejected from propeller 18.

The remainder of the means for mounting aerator 2 in tank 4 includes an elongated rod 60 that passes above the walls 4 from one side to the other in the manner of a bridge. Rod 60 is supported at each end by circular sleeves 62 to which rod 60 is suitably fixed, e.g., by a pin or set screw 61. Each sleeve 62 is free to move vertically on a vertical support rod 64 so that the height of rod 60 above the water surface 51 can be adjusted. A set screw 66 or the like releasably clamps sleeves 62 on the rods 64 to hold rod 60 in an adjusted position. The vertical support rods 64 are carried on the flanges 6 of the tank 4.

Another vertical support rod 68 having a threaded lower end 70 is provided. The end 70 is threadedly received in the horizontal flange 44 of mounting plate 42. Again, rod 68 passes vertically upwardly through a circular sleeve 72. Sleeve 72 is slidably mounted on rod 60 by passing rod 60 through a bore therein. The location of sleeve 72 along the rod 60 can be manually adjusted and the sleeve 70 held in place by a set screw 74. Similarly, the location of rod 68 inside sleeve 72 can be adjusted with a set screw 76 being used to lock rod 68 in sleeve 72. By sliding the sleeve 72 along the rod 60 and by sliding rod 68 inside sleeve 72, the longitudinal and vertical location of aerator 2 inside tank 4 can be quickly nd easily adjusted. Rod 68 and sleeve 72 are sized to support the entire weight of aerator 2.

An important feature of this invention is the fact that propeller 18 and propeller shaft 22 of the aerator are located in a substantially horizontal plane so that the stream of liquid which is oxygenated travels horizontally as it leaves the propeller. Thus, it is easier to oxygenate different levels or depths of the water using the aerator of this invention than with prior art aerators. By first adjusting the vertical location of aerator 2 in the water, the horizontally moving stream of liquid will oxygenate the appropriate level and then will rise vertically oxygenating levels about it. In addition, aerator 2 has better horizontal dispersion than prior art aerators which use vertically moving liquid columns.

Another important feature of this invention is cage 30. Cage 30 allows the propeller 18 to be operated at a relatively high speed to create a high draw rate through tube 48 and to disperse the air in the water without endangering the marine life. Water is drawn through slots 35, while the ribs 36 prevent the marine life from being drawn into the rotating propeller.

In addition, aerator 2 according to this invention is extremely simple to manufacture and produce and is therefore relatively inexpensive. For example, only a few basic components are required for aerator 2, the motor 10, the propeller 18, propeller shaft 22, slotted cage 30, mounting plate 42 and the draft tube 48. In addition, slotted cage 30 also serves as a portion of the means for supporting the aerator 2 on walls 4 rendering an elaborate supporting structure unnecessary.

Various modifications of this invention will be apparent to those skilled in the art since only a preferred embodiment has been described herein. Thus, the scope of the invention is to be limited only by the appended claims.

I claim:

1. A device for aerating liquids comprising:
   a rotary drive motor;
   an elongate drive shaft extending from and driven by said motor;
   a propeller secured to said drive shaft adjacent its distal end, said propeller having one or more propeller blades configured so that the liquid is drawn into the propeller from a first side thereof and is ejected in a stream from the propeller on a second side thereof;
   a hollow draft tube for aspirating air from above the surface of the liquid into the liquid;
   an apertured support cage having a length extending between said motor and said propeller so that the entire distance between the motor and the cage is enclosed, said cage including means for supporting said motor at a first end thereof, means for holding said draft tube adjacent a second end thereof with the upper end of the draft tube above the upper level of the liquid and the lower end of the draft tube djacent the second side of said propeller, and apertures located substantially along its entire length and periphery whereby liquid is drawn to the first side of said propeller from an area extending substantially between said motor and sid propeller.

2. A device in accordance with claim 1 wherein a mounting plate is connected to and extends upwardly from the first end of said cage.

3. A device in accordance with claim 1 wherein said apertures are formed as longitudinally extending slots.

* * * * *

UNITED STATES PATENT AND TRADEMARK OFFICE
CERTIFICATE OF CORRECTION

PATENT NO. : 4,409,100
DATED : October 11, 1983
INVENTOR(S) : Richard B. Rajendren It is certified that error appears in the above—identified patent and that said Letters Patent is hereby corrected as shown below:

Col. 1, line 6, "aearating" should read --aerating--;

Col. 4, line 1, "maybe" should read --may be--;

Col. 6, line 11, "djacent" should read --adjacent--; and

Col. 6, line 16, "sid" should read --said--.

Signed and Sealed this

Third Day of January 1984

[SEAL]

Attest:

GERALD J. MOSSINGHOFF

Attesting Officer

Commissioner of Patents and Trademarks